United States Patent [19]

Hamisch, Jr.

[11] Patent Number: 4,488,671

[45] Date of Patent: Dec. 18, 1984

[54] LABELER

[75] Inventor: Paul H. Hamisch, Jr., Franklin, Ohio

[73] Assignee: Monarch Marking Systems, Inc., Dayton, Ohio

[21] Appl. No.: 484,349

[22] Filed: Apr. 12, 1983

[51] Int. Cl.³ .......................... B65C 11/00; G03B 1/24

[52] U.S. Cl. ...................................... 226/79; 156/384; 156/577; 156/DIG. 48; 226/76; 474/164

[58] Field of Search ............... 156/384, 577, 579, 584, 156/DIG. 48, DIG. 49, 541; 101/288; 226/76–79; 400/616.3; 474/164

[56] References Cited

U.S. PATENT DOCUMENTS 2,468,025 4/1949 Boecking .............................. 226/79

3,346,158 10/1967 Hanson et al. ........................ 226/79

4,197,969 4/1980 Sasaki .................................. 226/79

*Primary Examiner*—Michael Wityshyn

*Attorney, Agent, or Firm*—Joseph J. Grass

[57] ABSTRACT

There is disclosed a hand-held labeler with a thermographic print head for printing on labels releasably secured to a carrier web, a delaminator for delaminating printed labels, an applicator for applying printed labels, a web feeding mechanism including an electric motor for advancing the carrier web, a detachable handle containing a source of electrical energy, and circuitry including a plurality of printed circuit boards electrically connecting the electrical energy source, the keyboard and the print head.

4 Claims, 15 Drawing Figures

LABELER

BACKGROUND OF THE INVENTION

1. Field of the Invention

This invention relates to the art of labelers and subcombinations thereof.

2. Brief Description of the Prior Art in the United States

The following are made of record: U.S. Pat. No. 4,264,396 to Stewart granted Apr. 28, 1981 and application Ser. No. 268,320, filed May 29, 1981, of Paul H. Hamisch, Jr.

SUMMARY OF THE INVENTION

This invention relates to a hand-held labeler having a composite feed wheel, to a composite feed wheel per se and to method of making a composite feed wheel. The feed wheel can be set up with any feed tooth pattern because the feed wheel hub and the teeth are separate. This enables the feed wheel to be made for different label widths, for different label lengths, and for different feed cut patterns, without having to re-tool the entire feed wheel. One specific embodiment for carrying out the invention has a molded hub with at least one axially extending slot. One or more rings each having one or more feed teeth and a projection corresponding to each slot is positioned on the hub as by sliding the ring or rings axially onto the hub. The same hub configuration can be used for a variety of different labelers by varying the rings themselves, or by varying the spacing of the rings, or both. The invention also relates to method of making a feed wheel having such desirable features.

DETAILED DESCRIPTION OF THE PREFERRED EMBODIMENT

Figure 1:
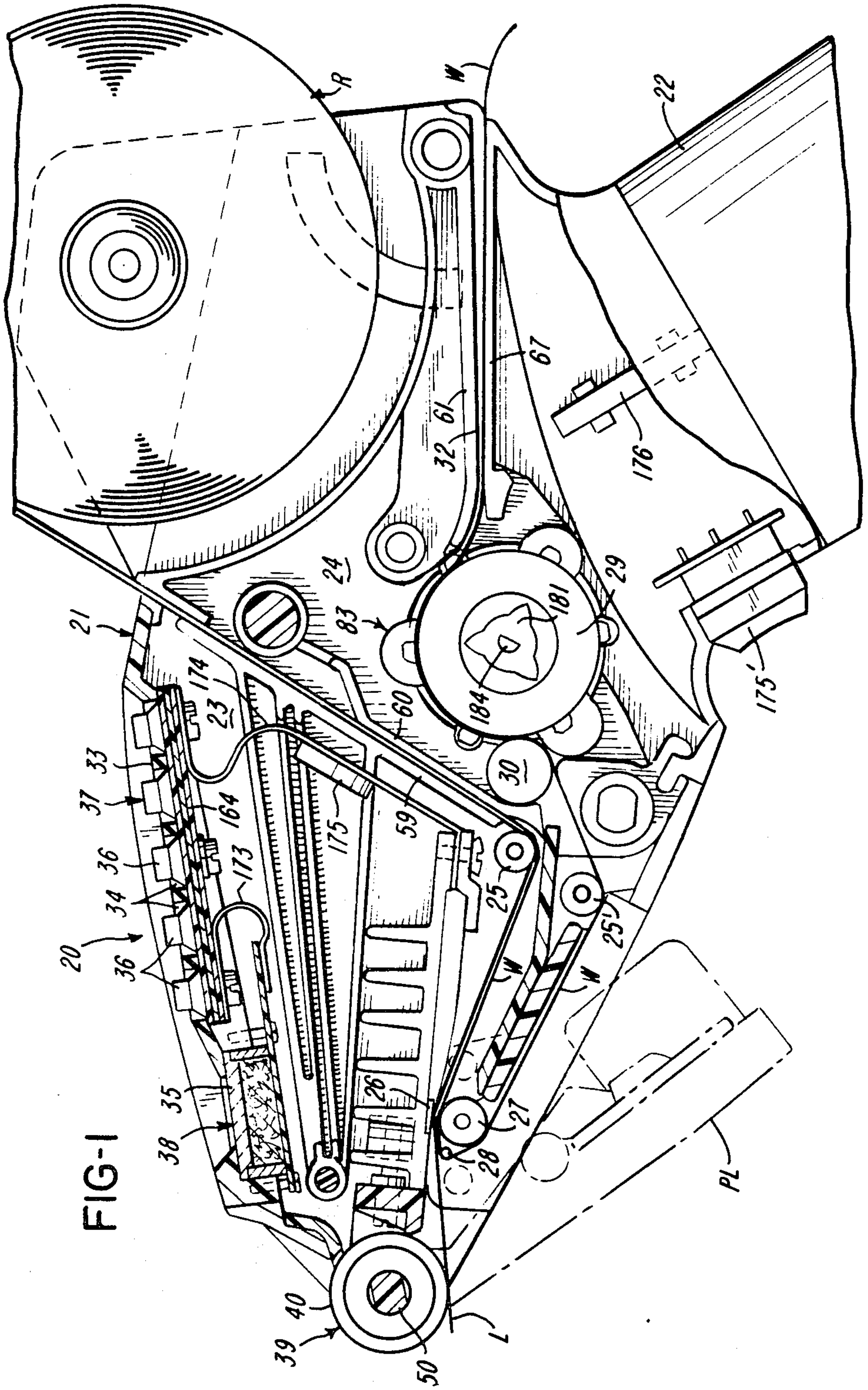
FIG. 1 is a partly sectional elevational view of a hand-held labeler in accordance with the invention.
Figure 3:
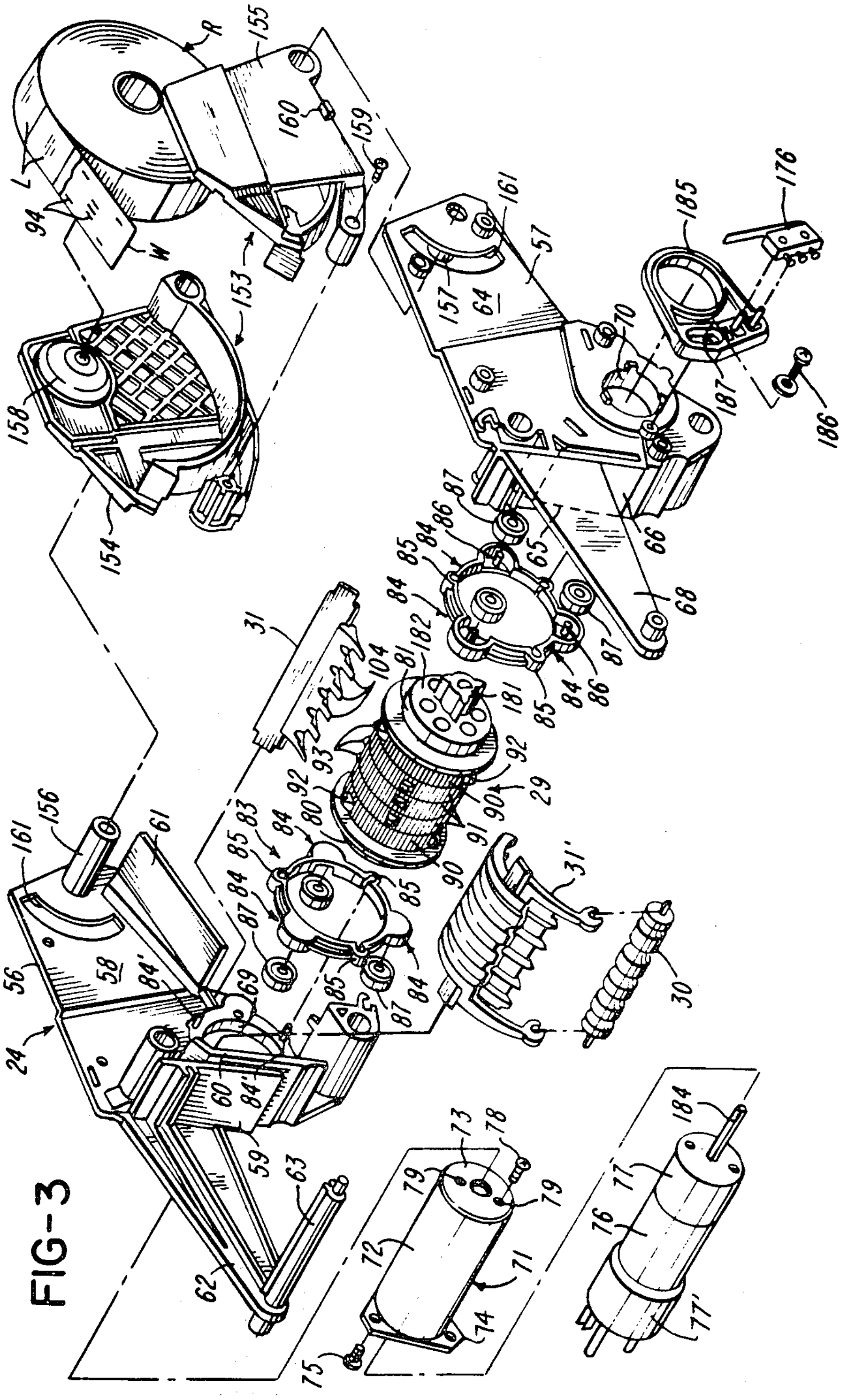
FIG. 3 is an exploded perspective view of portions of the labeler.

With reference to initially to FIG. 1, there is shown a hand-held labeler generally indicated at 20 having a housing 21 and a handle 22. A label supply roll R includes a carrier web W which releasably carries a series of pressure sensitive labels L. The housing 21 has interior space 23 which receives a subframe 24. The subframe 24 rotatably supports the label roll R and provides a path for the carrier web W. The web W passes from the label roll R, partly about roller 25, to between a print head 26 and a platen shown to be in the form of a roll 27, partly around a delaminator 28 shown to be in the form of a peel roller, then again partly around the platen roll 27, partly around a roll 25', between a feed wheel 29 and a back-up roll 30, past a stripper 31 (FIG. 3), through exit channel 32 from which the web W exits from the labeler 20. The roll 30 is mounted on a guide 31' (FIG. 3).

The housing 21 includes a housing section 33 having a plurality of openings 34 and 35. Keys 36 of a keyboard 37 project through openings 34 and a display 38 is visible through the opening 35.

An applicator 39 having a series of rolls 40 is positioned in overlying relationship with respect to the leading label L which has been almost fully delaminated at the delaminator 28.

Figure 2:
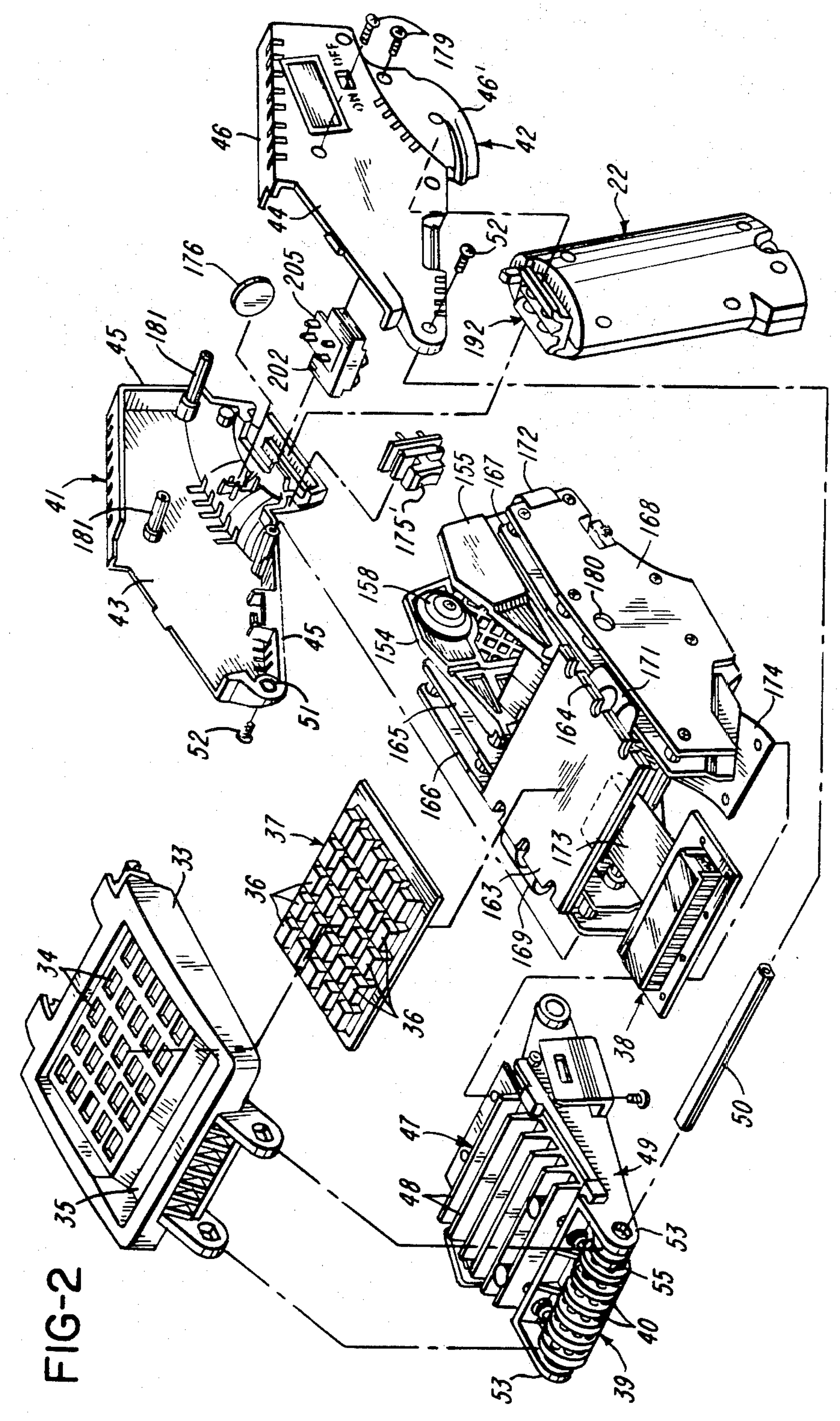
FIG. 2 is a partly exploded perspective view showing certain components of the labeler.

With reference to FIG. 2, it is seen that the housing 21 also includes housing sections 41 and 42. The housing sections 41 and 42 are essentially mirror image in construction. The housing sections 41 and 42 include respective side or wall portions 43 and 44 and flange portions 45 and 46.

The print head 26 is clamped or otherwise held to the bottom of a support 47 composed of metal to provide a heat sink. The support 47 has a plurality of fins 48. The support 47 is positioned in overlying relationship with respect to a support 49. A rod or shaft 50 of non-circular section is received at its end portions in matching holes 51, and screws 52 pass through housing sections 43 and 44 into end portions of the rod 50. The rolls 40 are rotatably mounted on the rod 50 and the support 49 has spaced arms 53 through which the rod 50 extends. Another support 54 best shown in FIGS. 5 and 6 has arms 55 through which the rod 50 also extends. The support 54 underlies the support 49.

Figure 11:
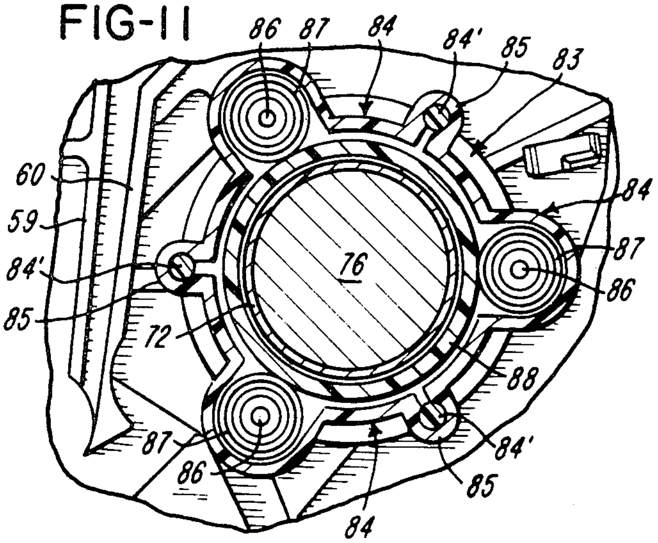
FIG. 11 is a sectional view showing the mounting structure for the feed wheel.

With reference to FIG. 3, there is shown the subframe 24 as having singularly configured mirror image subframe sections 56 and 57. The subframe section 56 has a side portion 58, guide members 59, 60 and 61, and arm 62 and a stud 63. The subframe section 57 has a side portion 64, guide members 65, 66 and 67, and an arm 68. The subframe sections 56 and 57 have aligned holes 69 and 70. A mounting member generally indicated at 71, and composed of metal for heat dissipating purposes, has a tubular portion 72, an end wall 73 and a flange 74. The mounting member 71 is inserted through the opening 69 and the flange 74 is held against the outside of the subframe section 56 by means of screws 75. The outside of the tubular portion 72 makes a close fit in the hole 69. An electric motor 76 is disposed entirely inside the tubular portion 72 and as is preferred the speed reducer 77 is disposed entirely inside the tubular portion 72. A shaft encoder 77′ projects slightly beyond the motor 76. Screws 78 pass through holes 79 and are threaded into end portion of the speed reducer 77. As shown in FIG. 11 there is clearance between the mounting member 71 and the inside of the feed wheel 29. The feed wheel 29 has a pair of annular outer surfaces 80 and 81. A plurality of teeth 92 and 93 are arranged in a desired pattern on the outer periphery of the feed wheel 29 between the outer surfaces 80 and 81. A pair of identical holders 83 are mounted on pins 84′ on the subframe sections 56 and 57 adjacent respective openings 69 and 70. Each holder 83 is shown to have three holder sections 84 joined by C-shaped flexible connectors 85. Each holder section 84 has a pin 86 for mounting rolling contact members, specifically a ball bearing 87. As shown in FIG. 11, outer races of the ball bearings 87 contact the outer surface 80 at three points of contact. Each holder 83 is configured so that the circle defined by the ball bearings 87 at the points of contact is smaller than the diameter of the respective outer surface 80 or 81 in the as-molded condition of the respective holder 83. Each holder 83 can be expanded slightly. The connections 85 aid in this expansion. In assembling the holder 83 and its ball bearings 87 onto the feed wheel 29, the holder 83 is expanded slightly and moved into position around the outer surface 80 or 81. The holder 83 will eliminate play because there is no clearance between outer races of the ball bearings 87 and the outer surfaces 80 or 81. As shown, each set of ball bearings 87 supports the feed wheel 29 at three places and specifically at three angularly spaced intervals of 120 degrees. The feed wheel 29 is rotatably mounted with very little friction. The reverse movement of the feed wheel 29 can be prevented either by the motor 76 itself or by any suitable known type of anti-backup device.

Figure 10:
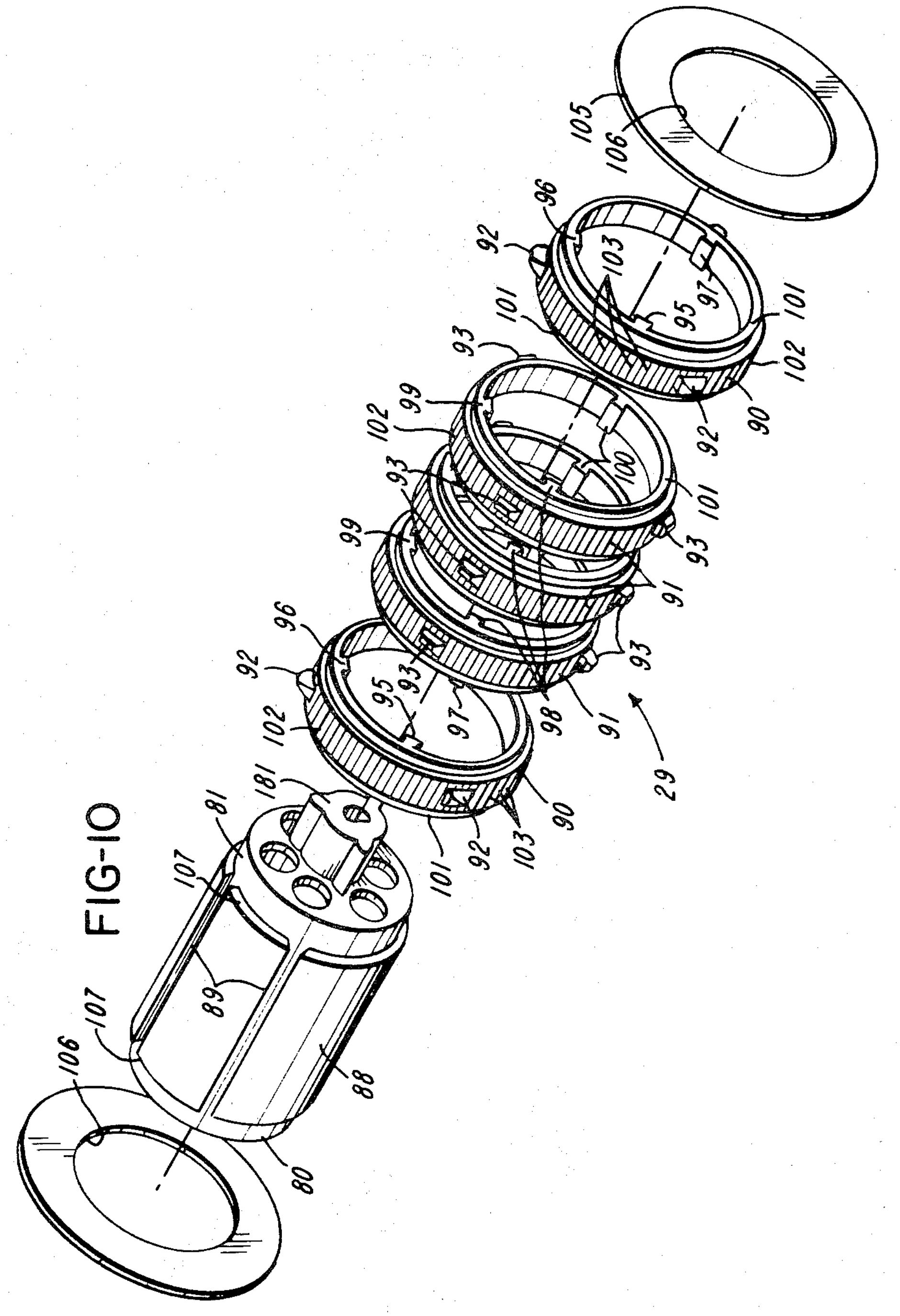
FIG. 10 is an exploded perspective view of the feed wheel.

With reference to FIG. 10, the feed wheel 29 is shown to have a hub or base 88 with axially extending dovetail grooves or recesses 89. The grooves 89 are disposed at different angular locations to aid in orientation of rings 90 and 91. The rings 90 and 91 have respective outwardly projecting feed teeth 92 and 93 which can engage feed cuts 94 (FIG. 3) in the carrier web W. The rings 90 have inwardly extending projections 95, 96 and 97 which match the spacing of grooves 89. The rings 91 have inwardly extending projections 98, 99 and 100 which also match the spacing of grooves 89. As shown, the teeth 92 of the rings 90 are axially aligned, and the teeth 93 of the rings 91 are axially aligned. The teeth 92 and 93 make the desired feed tooth pattern and match the feed slot pattern in the carrier web W illustrated in FIG. 3. A feed wheel 29 having any selected feed tooth pattern can be constructed by simply providing rings having the desired arrangement of feed teeth. Also, a feed wheel 29 can be constructed of any desired effective diameter for a different label length, for example by changing the wall thickness of the ring 90 or 91. Each ring 90 and 91 is a coupling device which couples one or more teeth 92 and 93 to the hub 88. Although the teeth 92 can be coupled to the base 88 by other than such a unitary ring 90 or 91, the use of rings is preferred. It is preferred that the hub and the rings 90 and 91 each be of one-piece molded plastics construction. The rings 90 and 91 fit snugly onto the hub 88 to avoid any play and thus the feed wheel 29 is a composite which can be precision-built at low cost and yet have the ability to be constructed quickly in the selected pattern. If desired, rings 90 can be color-coded in one color and like rings 91 can be color-coded of a different color to facilitate parts storage and subsequent assembly. As shown in FIG. 10, each ring 90 and 91 has a pair of narrow annular reduced diameter portions 101 between which there is an annular portion 102 having a closely spaced axially extending serrations 103. The serrations 103 reduce the area of contact between the outer surface of the feed wheel 29 and the carrier web W. As shown, the teeth 92 and 93 are on the respective annular portions 102. When the rings 90 and 91 are stacked on the hub 88, the adjacent reduced diameter portions 101 of adjacent pairs of wheels 90 and 91 or 91 and 91 provide grooves which receive carrier web stripper fingers 104 of the stripper 31 (FIG. 3). When assembled, the rings 90 and 91 are in end-to-end abutting relation. The feed wheel 29 illustrated diagrammatically in FIG. 3 does not show the reduced diameter, groove-defining portions 101. Outboard of the series of rings 90 and 91 are discs 105 received around the surfaces 80 and 81. Each disc 105 has a hole 106. The discs 105 are edge guides for the carrier web W. Each disc 105 is disposed between a shoulder 107 on the hub 88 and the respective holder 83. The discs 105 can rotate relative to the hub 88 as the feed wheel 29 advances the carrier web W. In assembling the feed wheel 29, the rings 90 and 91 are slid axially onto the hub 88, the discs 105 are positioned around surfaces 80 and 81 adjacent and against shoulders 107, and the holders 83 and their ball bearings 87 are positioned around the surfaces 80 and 81.

Figure 5:
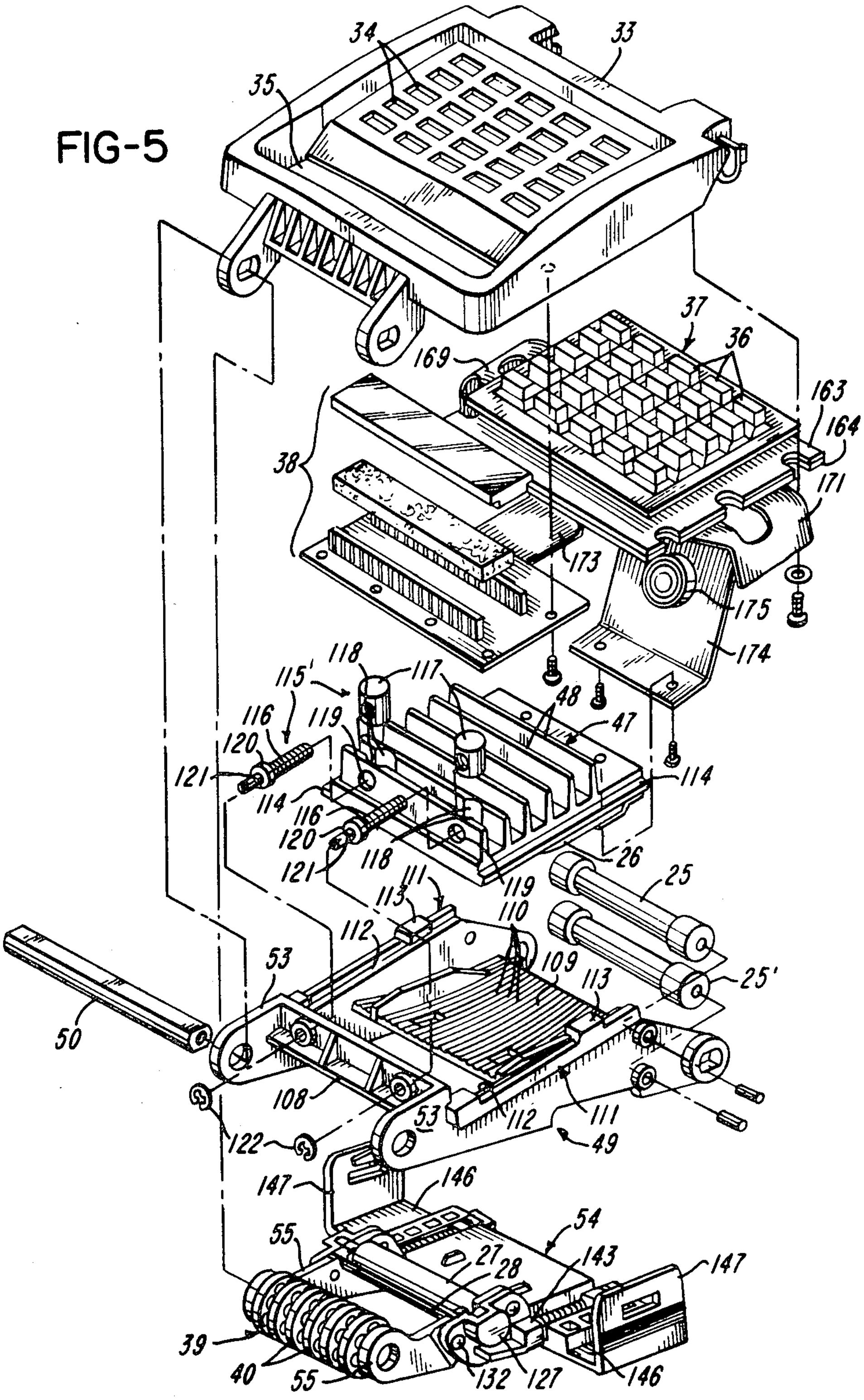
FIG. 5 is an exploded perspective view showing the arrangement of the keyboard, the display, the print head, various supports, the platen roll and the applicator.
Figure 15:
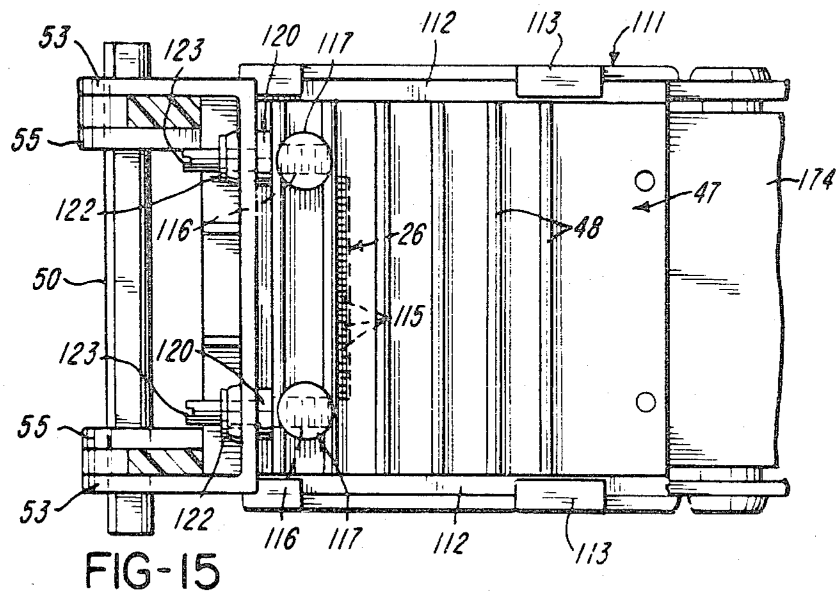
FIG. 15 is a plan view showing the mechanism by which the print head can be aligned and held in alignment relative to the axis of the platen roll.

With respect to FIGS. 5 and 15, the support 49 is shown to have a transverse member 108 joining members 53 and a transverse guide 109 having ridges 110. The members 53 have spaced tracks 111 defined by grooves 112 and flanges 113. The support 47 has a pair of flanges 114 received in the tracks 111. The flanges 113 keep the flanges 114 against the bottoms of grooves 112, although the tracks 111 are wide enough for the support 47 to skew so that the linearly arranged printing elements 115 of the print head 26 can be aligned with the axis of the small diameter platen roll 27. The smaller the diameter of the platen roll the more important such alignment becomes to quality printing. The skew of the support 47 and the print head 26 which is secured to its underside is illustrated to be adjustable by an adjusting mechanism generally indicated at 115′. The adjusting mechanism 115′ is used when the labeler 20 is manufactured or when the print head 26 is replaced. The adjusting mechanism 115′ is illustrated as including a pair of adjusting screws 116 threadably received in annular members or bearings 117. The members 117 are insertable into and can rotate slightly relative to the support 47. Specifically, a pair of adjacent fins 48 have opposed concave seats 118 which receive the members 117. The endmost fin 48 has oversize openings 119 through which the screws 116 extend. The openings 119 are large enough to enable the members 117 to rotate enough to make the necessary screw adjustment of the support 47 in the tracks 111. The screws 116 have annular flanges 120 captive between the endmost fin 48 and the transverse member 108. Each screw 116 has a groove 121 which receives an E-ring 122. The end portion of each screw 116 has a screwdriver slot 123 (FIG. 15) to aid in rotation of the screws 116 individually.

Figure 6:
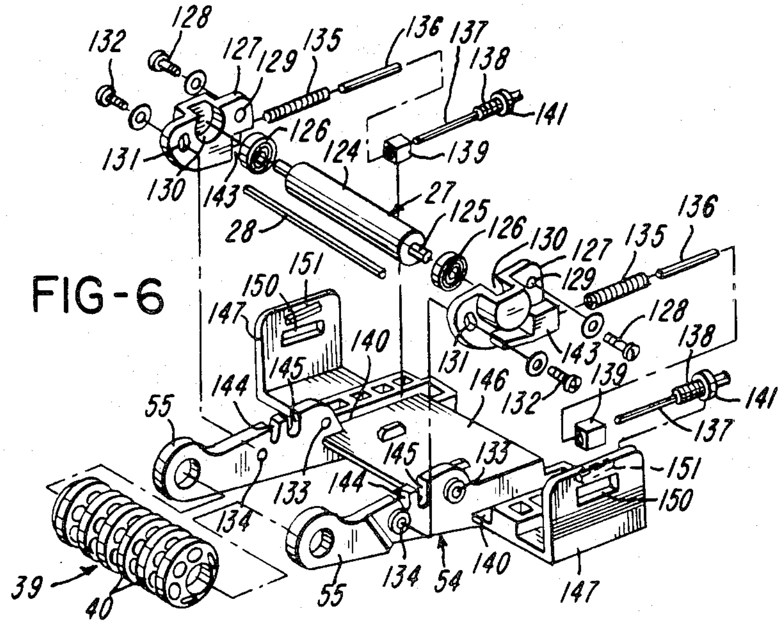
FIG. 6 is an exploded perspective view of the support for the platen roll, the adjusting mechanism and the applicator roll.
Figure 7:
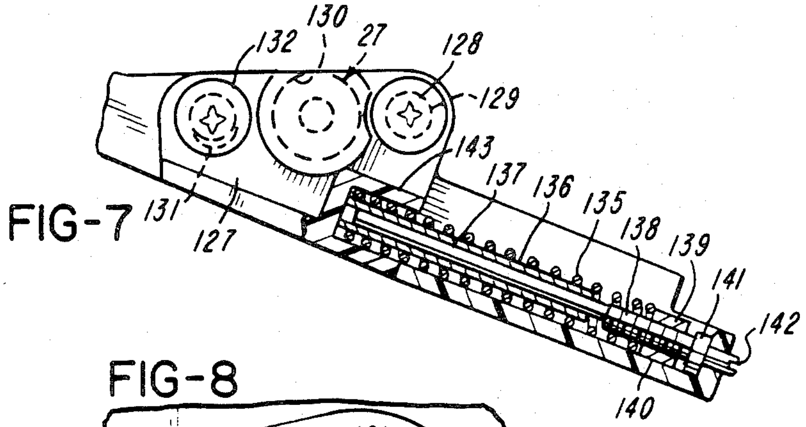
FIG. 7 is a partly sectional view showing an adjusting mechanism in detail.

With reference to FIGS. 5 and 6, the support 54 is shown to mount the platen roll 27. The platen roll 27 is preferably constructed of a roll 124 composed of elastomeric material mounted on a shaft 125. The shaft 125 extends beyond the ends of the roll 124 and is mounted in ball bearings 126. The ball bearings 126 are held captive in holders 127. Pivot screws 128 extend through holes 129 in holders 127 and allow the holders 127 to pivot slightly. The ball bearings 126 are nested in recesses 130. The holders 127 have elongated holes 131 through which screws 132 extend. Screws 128 and 132 are threaded into respective holes 133 and 134 in members or arms 55. The screws 132 are loose so that they do not clamp the holders 127 to the members 55 to enable the holders 127 to pivot. Each holder 127 is urged clockwise (FIGS. 6 and 7) by a helical compression spring 135 so that the roll 124 bears with the correct amount of pressure along its entire length against the underside of the carrier web W to press the overlying label L with the proper pressure against the printing elements 115 of the print head 26. A tube 136 is received within the spring 135 and an adjusting rod 137 is received within the tube 136. The rod 137 has a threaded portion 138. A nut 139 slidably received in a slot 140 is threadably received by the threaded portion 138. The rod 137 also has a flange 141 and an end portion with a screwdriver slot 142. The spring 135, the tube 136 and the rod 137 extend into a pocket portion 143 of the holder 127. The spring 135 acts on pocket portion 143 to urge the holder member 127 clockwise (FIGS. 6 and 7). The spring 135 also acts against the nut 139. The rod 137 can be rotated to adjust the force of the spring 135. By individually adjusting the rods 137, the force of the roll 124 against the printing elements 115 can be adjusted along the entire length of the series of printing elements 115.

The peel roller 28 is captive in slots 144 and the shaft 125 extends through slots 145 in the members 55. The members 55 are joined by a transverse member 146. The roll 124 is preferably of small diameter and the printing elements 115 are as close as possible to the peel roller 28. This maximizes the percentage of printable area on the label L. The roll 124 is preferably less than 0.4 inch in diameter and most preferably less than about 0.27 inch in diameter.

The support 54 is pivotable about the shaft 50 between the solid line position and the phantom line position indicated at PL in FIG. 1. The support 54 has transversely extending members 146 and upstanding members 147. By squeezing the members 147 between the thumb and index fingers of one hand, the members 147 deflect inwardly and become released from projections 149 on the inside of the housing sections 41 and 42. The members 147 have apertures 150 which receive the projections 149. When the support 54 moves down to a partially open position shown in FIG. 1 by the phantom lines PL, projections 151 on the inner side of the members 147 catch on projections 152 to prevent complete opening of the support 54, but the support 54 and the platen roll 27 are lowered enough to enable threading of the carrier web W during loading of the labeler 20. With the support 54 in the position shown by phantom lines PL, the members 147 can be spread, whereupon the support 54 can swing open to a fully open position to enable cleaning of the printing elements 115.

As shown in FIG. 3, the label supply roll R is mounted on a holder 153 having mirror image holder sections 154 and 155. The holder sections 154 and 155 are pivotally mounted for rotation as a unit on posts 156 and 157 on subframe sections 56 and 57. Thus, the holder 153 can be manually moved from the solid line closed position shown to an open position for ease of cleaning the carrier web pathway or removing a stray label. The roll R is rotatably mounted on opposed hub members 158, only one of which is shown. The holder sections 154 and 155 are shown held together by a screw 159. Lugs 160 project into arcuate slots 161 and limit the rotation of the holder 153.

Figure 4:
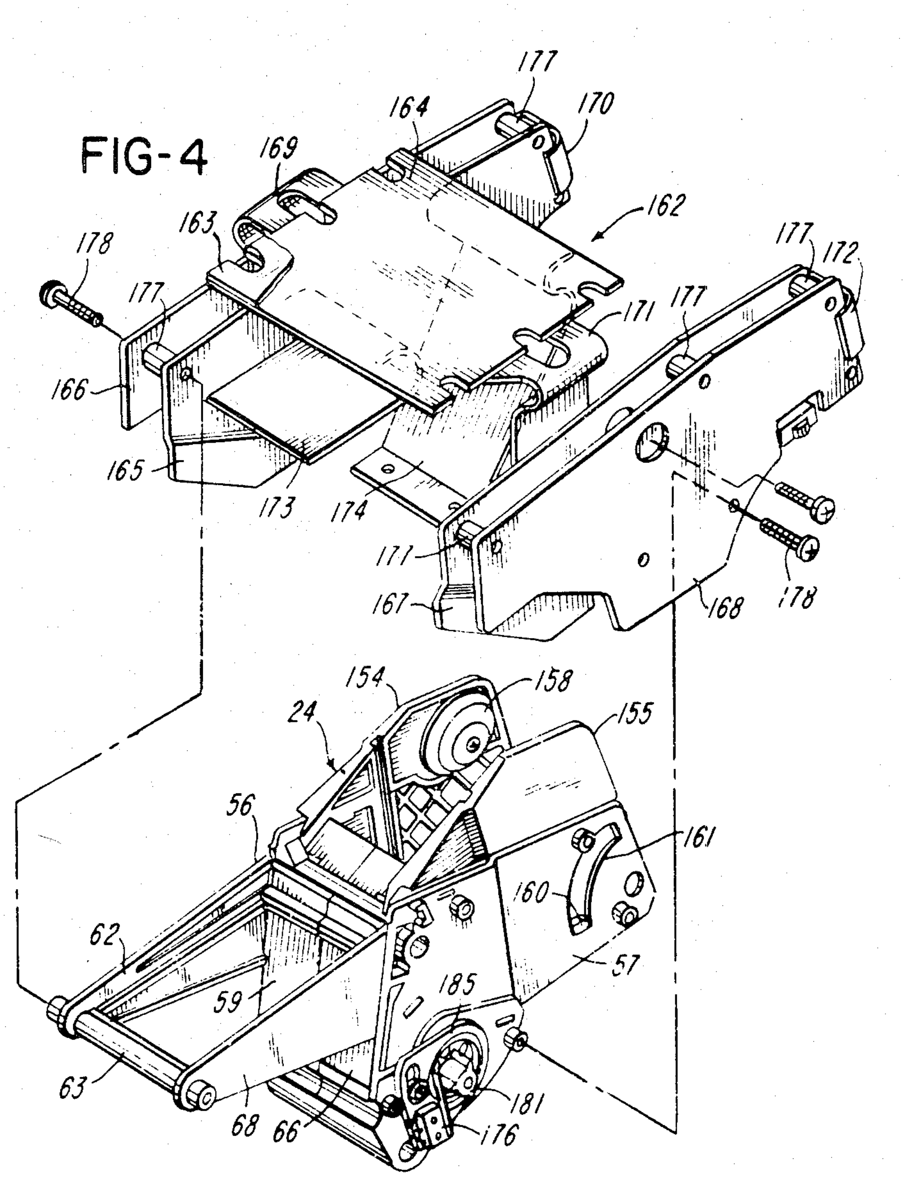
FIG. 4 is a partly exploded perspective view showing the manner in which circuit boards are arranged relative to the subframe.
Figure 9:
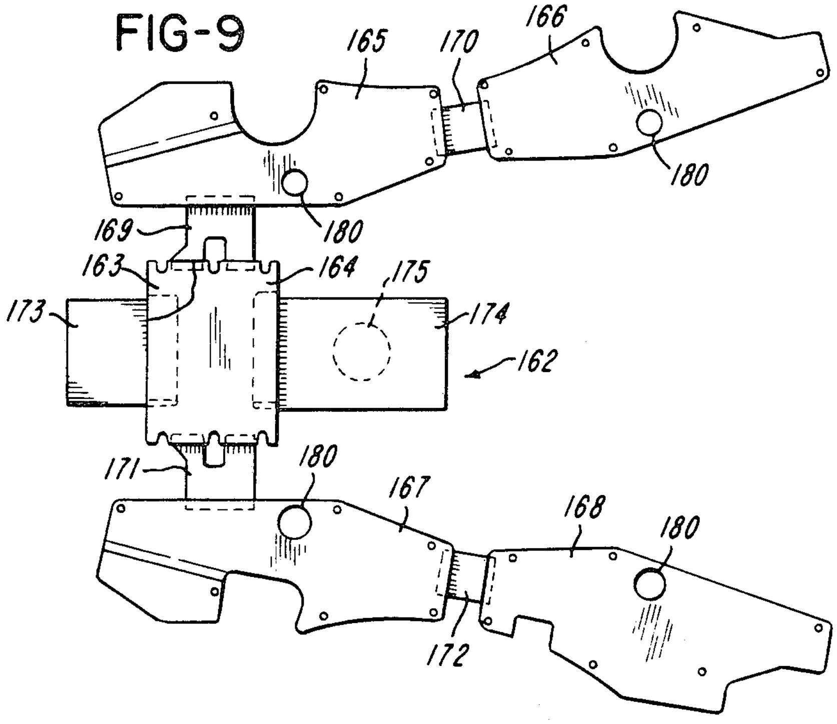
FIG. 9 is a plan view of an array of printed circuit boards and ribbon connectors before assembly into the housing.
Figure 13:
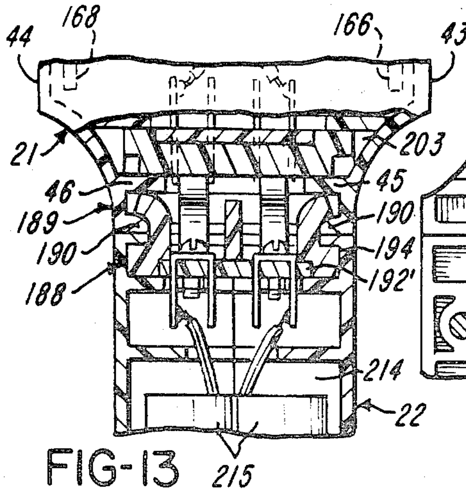
FIG. 13 is a fragmentary sectional view showing the breakaway connection between the handle and the housing.

With particular reference to FIG. 9, there is shown an array 162 of printed circuit boards 163 through 168. The printed circuit board 164 underlies but is electrically isolated from the printed circuit board 163 except for electrical connections therebetween. The printed circuit board 165 is electrically connected to the printed circuit board 164 by an electrical ribbon connector 169, the printed circuit board 165 is electrically connected to the printed circuit board 166 by an electrical ribbon connector 170, the printed circuit board 164 is also electrically connected to the printed circuit board 167 by an electrical ribbon connector 171, and the printed circuit board 167 is electrically connected to the printed circuit board 168 by an electrical ribbon connector 172. The display 38 (FIG. 1) is electrically connected to the printed circuit board 164 by an electrical ribbon connector 173, and the print head 26 is electrically connected to the printed circuit board 164 by an electrical ribbon connector 174. An audible device 175 is connected to the ribbon connector 174. Also suitably electrically connected to the array 162 are a small battery 176 for a low-battery sensing circuit (not shown), a manual switch 175' operable by the user's index finger to initiate a printing and dispensing cycle, and a cam operated switch 176. With reference to FIG. 4, the array 162 is shown in exploded disassembled orientation. The printed circuit boards 163 through 168 contain electronic components (not shown) electrically connected to operate the print head 26 in response to data inputted by the keyboard 37. The printed circuit boards 165, 166, 167 and 168 are all inclined with respect to the printed circuit boards 163 and 164, and more specifically are at right angles. The printed circuit boards 165 and 166 are closely spaced in side-by-side generally parallel relationship to each other, and the printed circuit boards 167 and 168 are closely spaced in side-by-side generally parallel relationship with respect to each other. The pairs of printed circuit boards 165 and 166, and 167 and 168, are spaced apart by spacers 177. Various screws 178 pass through the pairs of printed circuit boards 165 and 166, 167 and 168, and fasten them directly to the subframe 24. As shown in FIG. 13, the outer printed circuit boards 166 and 168 are spaced from the housing sections 41 and 42, so that any deflection of the housing 21 will not affect the printed circuit boards 163 through 168. Such deflection can result when the labeler 20 is dropped or otherwise impacted by excessive force. The housing sections 41 and 42 are secured to the subframe 24 by suitable fasteners 179. One such fastener 179 passes through the housing section 42 and into stud 181 which passes with substantial clearance through enlarged holes 180 in the printed circuit boards 165 through 168 so that the deflection of the housing 21 is not transmitted to the printed circuit board array 162. The array 162 is very compact as is important to a hand-held electrically selectable labeler specifically a hand-held labeler 20 with a thermal print head 26.

Figure 8:
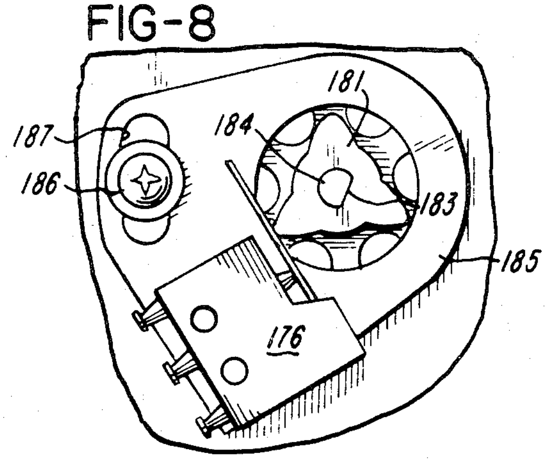
FIG. 8 is an enlarged elevational view of a switch and switch mounting structure.

With reference to FIG. 8, the switch 176 is operated by a three lobed cam 181 molded integrally with end wall 182 of the hub 88. As shown, end wall 182 and the cam 181 have a non-circular hole 183 matched with non-circular portion of the speed reducer output shaft 184. The switch 176 is mounted to a support 185 which is rotatably held to subframe section 57 and held in adjusted position by a screw 186 extending through an elongated slot 187.

Figure 12:
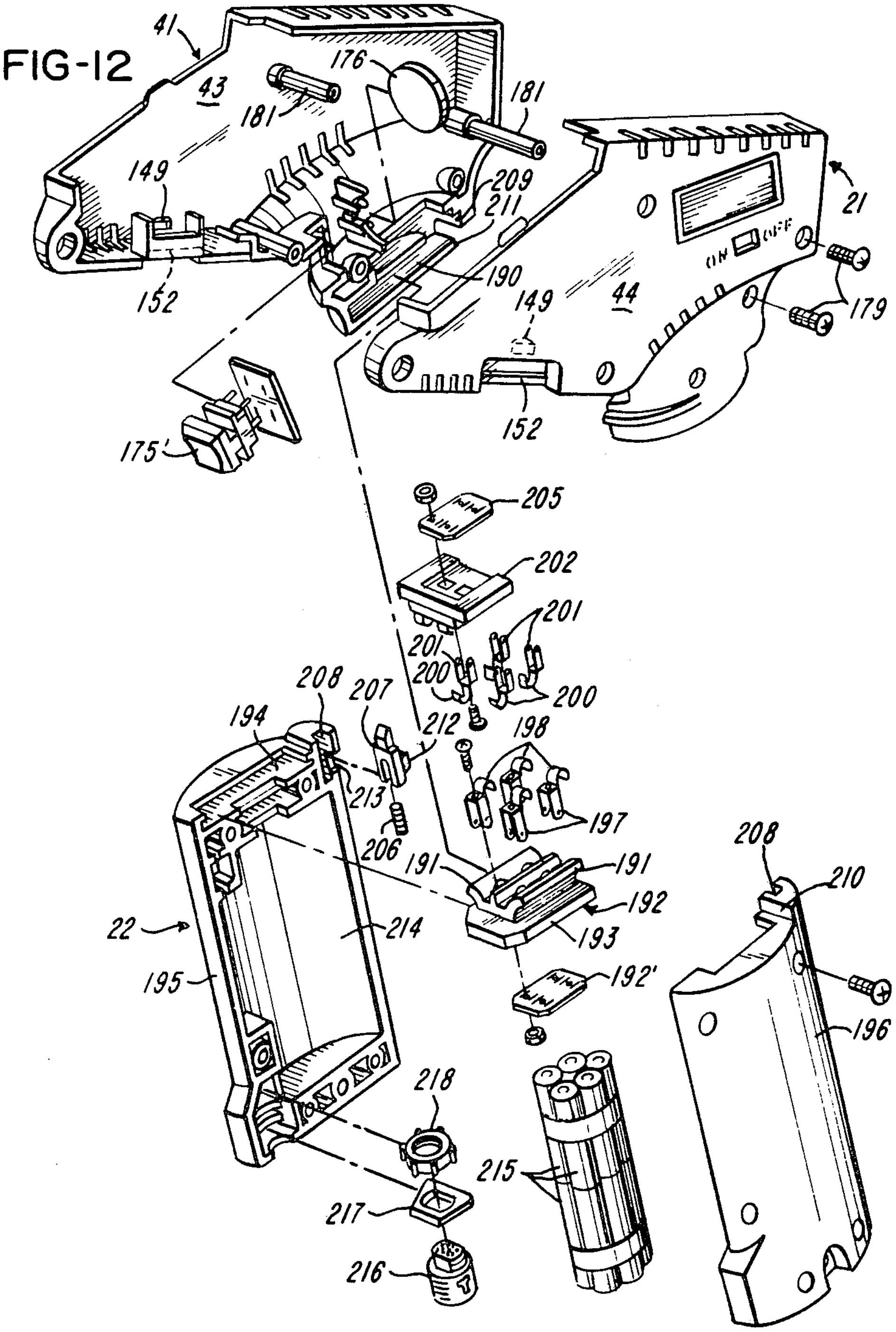
FIG. 12 is an exploded perspective view of the labeler housing and the handle with its electrical energy source.
Figure 14:
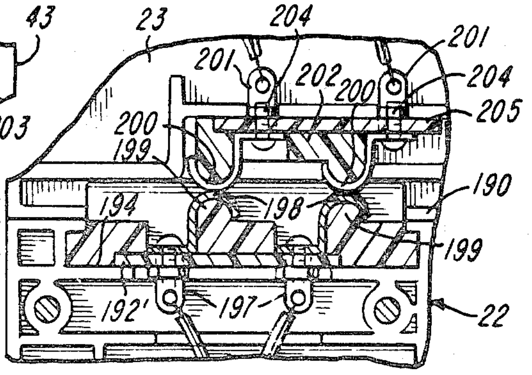
FIG. 14 is another fragmentary sectional view along a plane perpendicular to the plane of FIG. 13.

With reference to FIGS. 12, 13 and 14, there is shown the handle 22 which is detachably connected to the housing 21 by a detachable breakaway connection 188 which includes a dovetail slot 189 formed by opposed inwardly extending flanges 190 and outwardly extending flanges 191 of a connector 192. The connector 192 is composed of an elastomeric material having a selected hardness so that it will hold the handle 22 to the housing but will deflect to release the housing 21 when excessive force is applied as when the labeler 20 is dropped. When that happens the flanges 191 deflect inwardly out of the dovetail slot 189 and the housing 21 and the handle 22 separate. The connector 192 has a planar portion 193 captive in pockets 194 in the mirror image handle sections 195 and 196 of the handle 22. As shown in FIGS. 13 and 14, contacts 197 are J-shaped and are secured to a planar insulator 192'. The bottoms 198 of the J's are resiliently supported by convex portions 199 of the connector 192. The contacts 197 make connection with contacts 201 at the bottoms 200 of the J's of the J-shaped contacts 201. The bottoms 200 are resiliently supported by a pad 202 of resilient elastomeric material which is captive in a pocket 203. Fasteners 204 pass through a planar insulator 205. The handle 22 is attached to the housing 21 by sliding the handle 22 onto the housing 21 by means of the dovetail slot 189 and the connector 192. The handle 22 is releasably latched in position by a spring 206 acting on a latch 207. The spring 206 and the latch 207 are slidably received in a pocket 208. When the handle 22 is in its assembled position the latch 207 cooperates with shoulder 209. Also a shoulder 210 bears against a stop 211. A manually engageable projection 212 extends through opening 213 to enable manual release of the latch 207. The handle sections 195 and 196 provide a cavity for receiving rechargeable batteries 215 which are wired to the contacts 197. A connector 216 is coupled to the handle 22 by a washer 217 and a nut 218. The connector 216 is also electrically connected to the batteries 215 for recharging the batteries 215.

Other embodiments and modifications of the invention will suggest themselves to those skilled in the art, and all such of these as come within the spirit of this invention are included within its scope as best defined by the appended claims.

I claim:

1. A feed wheel adapted to advance a web, the feed wheel including a hub, means including feed teeth selectively coupled to the hub for providing a selected feed tooth pattern, wherein the means providing a selected feed tooth pattern includes a plurality of rings, each ring having at least one of said feed teeth, means for coupling each ring in a selected position on the hub, wherein the hub includes at least one axially extending groove, each ring having a projection extending into and keyed in the groove, wherein the rings are adapted to be slid axially onto the hub in oriented relationship.

2. A feed wheel adapted to advance a web, the feed wheel including a hub, means including feed teeth selectively coupled to the hub for providing a selected feed tooth pattern, wherein the means providing a selected feed tooth pattern includes a plurality of rings, each ring having at least one of said feed teeth, means for coupling each ring in a selected position on the hub, wherein the hub includes at least one axially extending groove, each ring having a projection extending into and keyed in the groove, wherein the rings are adapted to be slid axially onto the hub in oriented relationship, and a pair of discs received on the hub in straddling relationship to the rings.

3. A feed wheel adapted to advance a web, the feed wheel including a hub, means including feed teeth selectively coupled to the hub for providing a selected feed tooth pattern, wherein the means providing a selected feed tooth pattern includes a plurality of rings, each ring having at least one of said feed teeth, means for coupling each ring in a selected position on the hub, wherein the hub includes at least one axially extending groove, each ring having a projection extending into and keyed in the groove, wherein the rings are adapted to be slid axially onto the hub in oriented relationship, wherein the hub has a pair of outwardly facing shoulders, and a pair of discs received on the hub against the shoulders in straddling relationship to the rings.

4. A feed wheel adapted to advance a web, the feed wheel including a hub, means including feed teeth selectively coupled to the hub for providing a selected feed tooth pattern, wherein the means providing a selected feed tooth pattern includes a plurality of rings, each ring having at least one of said feed teeth, means for coupling each ring in a selected position on the hub, wherein the hub includes at least two axially extending grooves, two of said grooves being disposed at other than 180 degrees, each ring having a projection extending into and keyed in the groove, and wherein the rings are adapted to be slid axially onto the hub in oriented relationship.

* * * * *